United States Patent
Hill

[11] 3,883,548
[45] May 13, 1975

[54] 3-ARYLTHIOALKYL-4-OPTIONALLY SUBSTITUTED SYDNONES

[75] Inventor: John B. Hill, Northbrook, Ill.

[73] Assignee: G. D. Searle & Co., Chicago, Ill.

[22] Filed: Apr. 6, 1973

[21] Appl. No.: 348,755

Related U.S. Application Data

[63] Continuation-in-part of Ser. No. 312,708, Dec. 6, 1972, abandoned.

[52] U.S. Cl............ 260/307 A; 260/516; 260/518 R; 260/518 A; 260/519; 260/570.55; 260/570.6; 260/570.7; 424/272
[51] Int. Cl................................... C07d 85/50
[58] Field of Search........................... 260/307 A

[56] References Cited
FOREIGN PATENTS OR APPLICATIONS
1,057,124  5/1959  Germany

*Primary Examiner*—Donald G. Daus
*Assistant Examiner*—Raymond V. Rush
*Attorney, Agent, or Firm*—John A. Dhuey

[57] ABSTRACT

Preparation and the valuable anti-inflammatory and antibiotic properties of substituted sydnones, represented by the formula

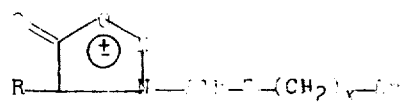

wherein R is hydrogen, lower alkyl, phenyl or bromo, Alk is alkylene having more than 1 and fewer than 5 carbon atoms, $x$ is oxygen, thio, sulfinyl or sulfonyl, $x$ is 0 or 1, and Ar is naphthyl, phenyl or substituted phenyl, preferably having an arylthioalkyl substituent, as typified by 3-[2-(phenylthio)ethyl]sydnone, are disclosed.

22 Claims, No Drawings

3-ARYLTHIOALKYL-4-OPTIONALLY SUBSTITUTED SYDNONES

This application is a continuation-in-part of my co-pending application Ser. No. 312,708, filed Dec. 6, 1972, now abandoned.

This invention relates to sydnones and to processes for the preparation thereof. More particularly, this invention provides new, useful, and unobvious chemical compounds of the formula

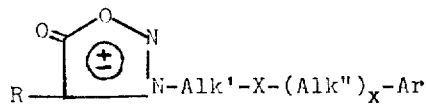

wherein R represents hydrogen, halogen, lower alkyl, (lower alkoxy)carbonyl(lower alkyl), carboxy(lower alkyl), cycloalkyl, phenethyl, benzyl, or phenyl; Alk' and Alk'' each represent lower alkylene; X represents oxygen, optionally alkylated imino, optionally alkylated phosphinidene, or optionally-oxygenated sulfur; $x$ represents 0 or 1; and Ar represents phenyl, naphthyl, anthryl, phenanthryl (each of which can be substituted by lower alkyl, halogen amino, carboxyl, lower alkoxy, and/or nitro), pyridyl, pyrimidyl, quinolyl, isoquinolyl, pyrrolyl, thienyl, furyl, imidazolyl, oxazolyl, thiazolyl, benzofuranyl, benzothienyl, benzimidazolyl, benzoxazolyl or benzothiazolyl.

The halogens comprehended by R and (as substituents in the aromatic nucleus contemplated) Ar are fluoro, chloro, bromo, and iodo, among which, in the case of R but not Ar, bromo is preferred.

The lower alkyls comprehended by R and Ar are methyl, ethyl, propyl, isopropyl, butyl, isobutyl, sec.-butyl, tert.-butyl, pentyl, neopentyl, hexyl, isohexyl, heptyl and like monovalent, saturated, acyclic, straight- or branched-chain, hydrocarbon groupings of the formula $$-C_nH_{2n+1}$$

wherein $n$ represents a positive integer less than 8.

The cycloalkyls contemplated by R are preferably those containing more than 2 and fewer than 7 carbons, viz., cyclopropyl, cyclobutyl, cyclopentyl, and cyclohexyl.

The lower alkylenes contemplated by Alk' and Alk'' are methylene, ethylene, trimethylene, propylene, tetramethylene, 1,1-dimethylethylene, pentamethylene, 2,2-dimethyltrimethylene, and like bivalent, saturated acyclic, straight- or branched-chain, hydrocarbon groupings having the formula $$-C_nH_{2n}-$$

wherein $n$ is defined as before. Among these lower alkylenes, those containing more than 1 and fewer than 5 carbon atoms are preferred embodiments of Alk'; and methylene is the preferred embodiment of Alk''.

The optionally-oxygenated sulfur contemplated by X is thio, sulfinyl, or sulfonyl, any of which is presently, but not necessarily ultimately, preferable to oxygen.

The optionally alkylated imino and phosphinidene groupings are represented, respectively, by

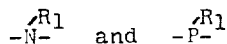

wherein $R_1$ is hydrogen or straight- or branched-chain alkyl containing 1 to 7 carbon atoms inclusive.

The lower alkoxys contemplated by R and Ar are groupings of the formula lower alkyl—O— wherein lower alkyl is defined as above.

The point of attachment of the groups contemplated by Ar is not critical; and the positioning of the optional substituents therein (viz., lower alkyl, halogen, lower alkoxy, and/or nitro) relative to the point of attachment of the phenyl, naphthyl, anthryl or phenanthryl nucleus and also—where more than 1 is present—relative to each other, is not critical. Although more than 1 such substituent can be present, alike or different, fewer than 4 halogens or fewer thahn 2 of the other substituents is preferred.

The compounds to which this invention relates are useful by reason of their valuable biological properties. An especially valuable property characteristic of the instant compounds is anti-inflammatory activity. The compounds are also antibiotic, being effective against bacteria such as *Bacillus subtilis* and *Erwinia sp.*, fungi such as *Trichophyton mentagrophytes* and *Verticillium albo-atrum*, and algae such as *Chlorella vulgaris*.

The anti-inflammatory utility of the instant compounds is evident from the results of a standardized test for this property described in the paragraph beginning with line 34 in column 2 of U.S. Pat. No. 3,528,966.

Further evidence of the anti-inflammatory utility of the instant compounds is provided by the results of a standardized test for their capacity to inhibit the edema induced in rats by injection of carrageenin. The procedure is a modification of one described by Winter, et al., *Proc. Soc. Exp. Biol. Med.*, 111, 544 (1962). Compound is administered subcutaneously or intragastrically—dissolved or suspended in 0.5 ml. of aqueous 0.85% sodium chloride, propylene glycol, a mixture of these vehicles, or corn oil—to each of 10 male rats weighing 100-130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total volume of the 2 hind feet in the group treated therewith, which is measured in arbitrary units 5 hr. after the carrageenin injection, is significantly ($P \leq 0.05$) less than the corresponding value for the control group.

Still further evidence of the anti-inflammatory utility of the instant compounds is provided by the results of a standardized test for their capacity to inhibit the edema induced in rats by injection of *Mycobacterium butyricum*. The procedure, which is similar to one described by Pearson, et al., *Arthritis Rheumat.*, 2, 440 (1959), follows. Intact male Sprague-Dawley rats are randomized in groups of 12, 1 group for each compound to be tested plus 1 group to serve as controls. Each animal is injected intradermally (without any anesthesia) on the base of the tail with 0.6 mg. of dry heat-killed *Mycobacterium butyricum* (Difco 0640-33) suspended in 0.05 ml. of paraffin oil containing 2% digitonin, whereupon the prescribed dose of compound (initially 5 mg.)—dissolved or suspended in a vehicle consisting of 0.2 ml. of either corn oil or a mixture of 20 ml. of aqueous 0.85% sodium chloride with 1 drop of polysorbate 80—is intragastrically or subcutaneously administered. Administration thus of compound is repeated daily for the next 18 consecutive days. The control group is identically and concurrently administered vehicle alone. On the 20th day, the rats are sacrificed, and the total volume of each pair of hind feet is measured in arbitrary units. A compound is considered anti-inflammatory if the average volume of the hind feet in the group treated therewith is significantly ($P \leq 0.05$) less than the corresponding value for the control group.

The product of Example 1D hereinafter was found to be anti-inflammatory at 1 mg. intragastrically in the first and third of the foregoing three tests, and at 10 mg. subcutaneously in the remaining test.

The antibiotic utility of the instant compounds can be demonstrated by standardized tests described in U.S. Pat. No. 3,682,951, as follows: for antibacterial activity, see line 44, column 2, through line 5, column 3; for anti-fungal and anti-algal activities, see line 62, column 3, through line 64, column 4.

Those skilled in the art will recognize that observations of activity in standardized tests for particular biological effects are fundamental to the development of valuable new drugs, both veterinary and human. Distinct from such applications, anti-algal compounds are adapted to the conditioning of boiler feedwater and the like.

Preparation of the compounds of this invention proceeds by heating an amine of the formula $$H_2N-Alk'-X'-(Alk'')_x-Ar$$

(I)

with a 2-bromoalkanoic acid of the formula

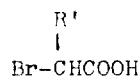

in the presence of sodium methoxide, using tert/-butyl alcohol as solvent. In the foregoing 2 formulas, Alk', Alk'', $x$, and Ar retain the meanings previously assigned; R' is identical with R except that halogen is excluded; and X' represents oxygen, thio, optionally alkylated imino or optionally alkylated phosphinidene. Potassium carbonate or sodium hydroxide can be substituted for the sodium methoxide, and tetrahydrofuran or ethyl alcohol for the tert.-butyl alcohol, if desired. The resultant amino acid

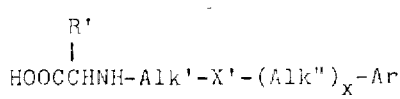

is converted to the corresponding N-nitroso compound by contacting for 4–15 hr. at 0°–5°C. with sodium nitrite and hydrochloric acid in a solvent medium comprising water and dichloromethane. Prolonged reaction times, higher reaction temperatures, excess sodium nitrite, and/or substitution of acetic for hydrochloric acid may promote oxidation of thio, if present, to sulfinyl. From an N-nitrosoamino acid of the formula

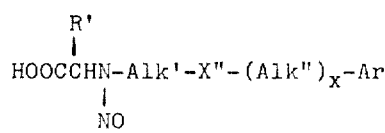

in which X'' represents oxygen, optionally alkylated imino, optionally alkylated phosphinidene, thio, or sulfinyl and R', Alk', Alk'', $x$, and Ar are defined as before, upon prolonged contact with acetic anhydride in a nitrogen atmosphere, the corresponding sydnone

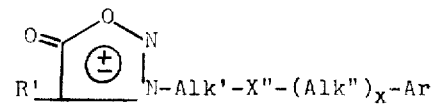

is obtained. The sulfidic sydnones of this invention, i.e., those having the formula

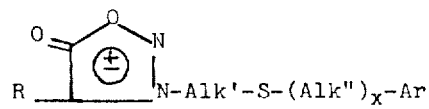

are converted to corresponding sulfoxides by contacting with 1 equivalent of sodium periodate at 4°–8°C. for 24 hr., whereas sulfones result if the amount of periodate is doubled and the temperature and reaction time increased to 25°C. for 4 days.

An exception to the foregoing procedures is the preparation of the 4-halosydnones hereof having the formula

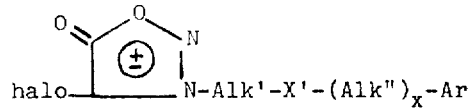

which is accomplished by contacting the corresponding 4-unsubstituted sydnones, in the presence of potassium acetate, with halogen and acetic acid.

The amines of formula I when Alk' is ethylene can be prepared by treating a compound of the formula $$Ar(Alk'')_xX'H$$

with azacyclopropane. Alternatively, but not limited to the situation when Alk' is ethylene, the amines of formula I can be prepared by treating a compound of the formula $$Ar(Alk'')_xX'H$$

with a primary amine of the formula $$Br-Alk'-NH_2$$

using alcohol solvents such as methanol, ethanol and t-butanol. In the above formulas Ar, Alk', Alk'', x and X' remain as defined hereinbefore.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees Centigrade and relative amounts of materials in parts by weight, except as otherwise noted.

EXAMPLE 1

A. N-[2-(Phenylthio)ethyl]glycinonitrile hydrochloride. A mixture of 37 parts of 2-(phenylthio)ethylamine, 12 parts of sodium cyanide, 22 parts of 30% formalin, and 24 parts of concentrated hydrochloric acid in 125 parts of water is stirred for 3 hours, then diluted with 450 parts of benzene. The resultant mixture is washed with water and thereupon extracted with saturated aqueous sodium bicarbonate. The extract is neutralized with concentrated hydrochloric acid, and the resultant mixture is extracted with benzene. The benzene extract is stripped of solvent by vacuum distillation, and the oily residue is taken up in methyl alcohol. Just sufficient hydrogen chloride — dissolved in isopropyl alcohol — to induce acidity is added, and the resultant precipitate is filtered off and dried in air. The product thus isolated is N-[2-(phenylthio)ethyl]glycinonitrile hydrochloride melting at approximately 125°–126°.

B. Barium N-[2-(phenylthio)ethyl]glycinate. A mixture of 31 parts of N-[2-(phenylthio)ethyl]glycinonitrile hydrochloride, 86 parts of barium hydroxide, 360 parts of water, and approximately 350 parts of methyl alcohol is heated t the boiling point under reflux for 5 hours, then cooled and filtered. The insoluble solid thus isolated is barium N-[2-(phenylthio)ethyl]glycinate which, when recrystallized from water, melts at 193°–196°.

C. N-Nitroso-N-[2-(phenylthio)ethyl]glycine. A mixture of 40 parts of barium N-[2-(phenylthio)ethyl]glycinate, 14 parts of sodium nitrite, 280 parts of water, and 107 parts of dichloromethane is stirred at 0° for 2 hours, whereupon 14 parts of concentrated hydrochloric acid is introduced. A further 14 parts of sodium nitrite is then added portionwise with stirring during 4 hours at 0°, after which stirring is continued at 0°–5° for 15 hours. The resultant mixture is filtered, the filtrate is extracted with dichloromethane, and the extract is washed with water and then extracted in turn with saturated aqueous sodium bicarbonate. The bicarbonate extract is acidified with concentrated hydrochloric acid, and the resultant mixture is extracted with dichloromethane. Evaporation of solvent affords N-nitroso-N-[2-(phenylthio)ethyl]glycine as the residue.

D. 3-[2-(Phenylthio)ethyl]sydnone. A mixture of 8 parts of N-nitroso-N-[2-(phenylthio)ethyl]glycine and 108 parts of acetic anhydride is maintained at room temperatures under nitrogen for 4 days, then poured into 500 parts of water. The resultant mixture is stirred for 2 hours at room temperatures, then extracted with dichloro-methane. The dichloromethane extract is consecutively washed with water, saturated aqueous sodium bicarbonate, and water, then stripped of solvent by vacuum distillation. The residue is 3-[2-(phenylthio)ethyl]sydnone which, recrystallized from ether, melts at 40°–42°. The product has the formula

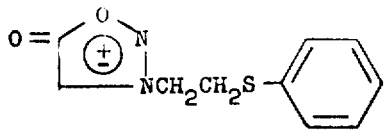

EXAMPLE 2

A. N-[2-(p-Chlorophenylthio)ethyl]glycine. A mixture of 38 parts of 2-[(p-chlorophenyl)thio]ethylamine, 24 parts of bromoacetic acid, 9 parts of sodium methoxide, and 625 parts of tert.-butyl alcohol is heated at the boiling point under reflux for 12 hours, then chilled. Insoluble solids are filtered out, washed with ether, and dried in air. The product thus isolated is N-[2-(p-chlorophenylthio)ethyl]glycine.

B. N-[2-(p-Chlorophenylthio)ethyl]-N-nitrosoglycine. A mixture of 40 parts of N-[2-(p-chlorophenylthio)ethyl]glycine, 12 parts of sodium nitrite, 250 parts of water, and 214 parts of dichloromethane is stirred at 0° for 2 hours, whereupon 50 parts of concentrated hydrochloric acid is introduced. A further 12 parts of sodium nitrite is then added portionwise with stirring during 4 hours at 0°, after which stirring is continued at 0°–5° 1 for 15 hours. The resultant mixture is filtered, the filtrate is extracted with dichloromethane, and the extract is washed with water and then extracted in turn with saturated aqueous sodium bicarbonate. The bicarbonate extract is acidified with concentrated hydrochloric acid, and the resultant mixture is extracted with dichloromethane. Evaporation of solvent affords N-[2-(p-chlorophenylthio)ethyl]-N-nitrosoglycine as the residue.

C. 3-[2-(p-Chlorophenylthio)ethyl)sydnone. A mixture of 12 parts of N-[2-(p-chlorophenylthio)ethyl]-N-nitrosoglycine and 216 parts of acetic anhydride is maintained at room temperatures under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum distillation. The residue is 3-[2-(p-chlorophenylthio)ethyl]sydnone which, recrystallized from a mixture of acetone and ether, melts at 66°–68°.

EXAMPLE 3

3-[2-(Phenylsulfinyl)ethyl]sydnone. A mixture of 3 parts of 3-[2-(phenylthio)ethyl]sydnone and 9 parts of sodium periodate in approximately 75 parts of 1:2 (by volume) methyl alcohol:water is stirred at 4°–8° for 24 hours. Insoluble solids are filtered out and washed with chloroform. Filtrate and wash liquor are combined, and the resultant solution is washed with water and then stripped of solvent by vacuum distillation, leaving 3-[2-(phenylsulfinyl)ethyl]sydnone which, recrystallized from a mixture of acetone and ether, melts at approximately 118°–119°. The product has the formula

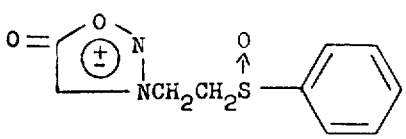

EXAMPLE 4

3-[2-(Phenylsulfonyl)ethyl]sydnone. A mixture of 4 parts of 3-[2-(phenylthio)ethyl]sydnone and 20 parts of sodium periodate in approximately 200 parts of 50% aqueous methyl alcohol is stirred at room temperatures for 4 days. Insoluble solids are filtered out and washed with chloroform. Filtrate and wash liquor are combined, and the resultant solution is washed with water and then stripped of solvent by vacuum distillation, leaving 3-[2-(phenylsulfonyl)ethyl]sydnone as the residue. Upon recrystallization from acetone, the product melts at approximately 141°–142°. It has the formula

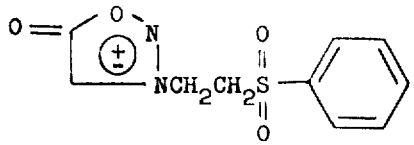

EXAMPLE 5

A. N-[2-(Phenylthio)ethyl]alanine. A mixture of 35 parts of 3-(phenylthio)ethylamine, 35 parts of 2-bromopropionic acid, 16 parts of potassium carbonate, and 360 parts of tetrahydrofuran is heated at the boiling point under reflux for 15 hours. The reaction mixture is then cooled to room temperature, whereupon insoluble solids are filtered out, washed with hexane, and dried in air. The product thus isolated is N-[2-(phenylthio)ethyl]alanine.

B. N-Nitroso-N-[2-(phenylthio)ethyl]alanine. To a stirred suspension of 40 parts of N-[2-(phenylthio)ethyl]alanine in 525 parts of acetic acid at room temperature is slowly added a solution of 18 parts of sodium nitrite in 20 parts of water. Stirring is continued for 2 hours, whereupon the reaction mixture is poured into water. The resultant mixture is extracted with dichloromethane. The dichloromethane extract is washed with water and extracted, in turn, with saturated aqueous sodium bicarbonate. The bicarbonate extract is acidified with concentrated hydrochloric acid. The mixture thus obtained is extracted with dichoromethane. From this extract, on evaporation of solvent, N-nitroso-N-[2-(phenylthio)ethyl]alanine is obtained as the residue.

C. 4-Methyl-3-[2-(phenylthio)ethyl]sydnone. A mixture of 17 parts of N-nitroso-N-[2-(phenylthio)ethyl]alanine and 65 parts of acetic anhydride is heated at 55°–60° for 3 hours, then poured into 200 parts of water. The resultant mixture is stirred for 1 hour, then extracted with dichloromethane. The dichloromethane extract is consecutively washed with water, saturated aqueous sodium bicarbonate, and water, then stripped of solvent by vacuum distillation. The residue is 4-methyl-3-[2-(phenylthio)ethyl]sydnone which, recrystallized from a mixture of acetone and ether, melts at 69°–71°. The product has the formula

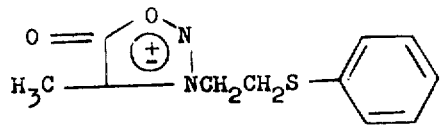

EXAMPLE 6

Substitution of an equivalent quantity of N-nitroso-N-[2-(phenylthio) ethyl]-2-propylglycine for the N-nitroso-N-[2-(phenylthio)ethyl]glycine called for in Example 1D, and increasing the amount of acetic anhydride to approximately 215 parts, affords, by the procedure there detailed, 3-[2-(phenylthio)ethyl]-4-propylsydnone melting at 49.5°–51.5°

EXAMPLE 7

A. N-[2-(p-Tolylthio)ethyl]alanine. Substitution of 50 parts of 2-(p-tolylthio)ethylamine and 38 parts of 2-bromopropionic acid for the 2-[(p-chlorophenyl)thio]ethylamine and bromoacetic acid called for in Example 2A, and increasing the amounts of sodium methoxide and tert.-butyl alcohol to 27 and 900 parts, respectively, affords, by the procedure there detailed, N-[2-(p-tolylthio)ethyl]alanine.

B. N-Nitroso-N-[2-(p-tolylthio)ethyl]alanine. To a mixture of 52 parts of N-[2-(p-tolylthio)ethyl]alanine, 24 parts of concentrated hydrochloric acid, 350 parts of water, and 535 parts of dichloromethane is slowly added, with stirring at 0°, a solution of 14 parts of sodium nitrite in 50 parts of water. Stirring at 0° is continued for 4 hours after the addition is complete, whereupon the aqueous phase is separated and extracted with dichloromethane. The extract is combined with the organic phase of the reaction mixture, and the resultant solution is washed with water and then extracted with saturated aqueous sodium bicarbonate. The bicarbonate extract is acidified, and the resultant mixture is extracted with dichloromethane. Evaporation of solvent affords N-nitroso-N-[2(p-tolylthio)ethyl]alanine as the residue. C. 4-Methyl-3-[2-(p-tolylthio)ethyl]sydnone. A mixture of 20 parts of N-nitroso-N-[2-(p-tolylthio)ethyl]alanine and 215 parts of acetic anhydride is maintained at room temperatures under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum distillation. The residue is 4-methyl-3-[2-(p-tolylthio)ethyl]sydnone.

EXAMPLE 8

A. N-[2-(p-tert.-Butylphenylthio)ethyl]alanine. Substitution of 34 parts of 2-[(p-tert.-butylphenyl)thio]ethylamine and 25 parts of 2-bromopropionic acid for the 2-[(p-chlorophenyl)thio]ethylamine and bromoacetic acid, respectively, called for in Example 2A, and decreasing the amount of tert.-butyl alcohol to 545 parts, affords, by the procedure detailed in the aforesaid example, N-[2-(p-tert.-butylphenylthio)ethyl]alanine which, recrystallized from water, melts at 197°–200°.

B. N-[2-(p-tert.-Butylphenylthio)ethyl]-N-nitrosoalanine. A mixture of 40 parts of N-[2-(p-tert.-butylphenylthio)ethyl]alanine, 10 parts of sodium nitrite, 300 parts of water, and 175 parts of dichloromethane is stirred at 0° for 2 hours, whereupon 35 parts of concentrated hydrochloric acid is introduced. A further 10 parts of sodium nitrite is then added portionwise with stirring during 4 hours at 0°, after which stirring is continued at 0°–5° for 15 hours. The resultant mixture is filtered, the filtrate is extracted with dichloromethane, and the extract is washed with water and then extracted in turn with saturated aqueous sodium bicarbonate. The bicarbonate extract is acidified with concentrated hydrochloric acid, and the resultant mixture is extracted with dichloromethane. Evaporation fo solvent affords N-[2-(p-tert.-butylphenylthio)ethyl]-N-nitrosoalanine as the residue.

C. 3-[2-(p-tert.-Butylphenylthio)ethyl]-4-methylsydnone. A mixture of 21 parts of N-[2-(p-tert.- butylphenylthio)ethyl]-N-nitrosoalanine and 215 parts of acetic anhydride is maintained at room temperatures under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum distillation. The residue is chromatographed on neutral alumina, using benzene and mixtures thereof with increasing amounts of ethyl acetate as developing solvents. From an eluate comprising 5% ethyl acetate in benzene, on evaporation of solvent and recrystallization of the residue from ether, 3-[2-(p-tert.-butylphenylthio)ethyl]-4-methylsydnone melting at approxi. ately 60°–61° is obtained.

EXAMPLE 9

A. 2-tert.-Butyl-N-[2-(p-tert.-butylphenylthio)ethyl]glycine. Substitution of 49 parts of 2-(p-tert. butylphenylthio)ethylamine hydrochloride and 39 parts of 2-bromo-2-tert.-butylacetic acid for the 2-[(p-chlorophenyl)thio]ethylamine and bromoacetic acid called for in Example 2A, and increasing the amounts of sodium methoxide and tert.-butyl alcohol to 22 and 780 parts, respectively, affords, by the procedure detailed in the aforesaid example, 2-tert.-butyl-N-[2-(p-tert.-butylphenylthio)ethyl]glycine which, recrystalized from methyl alcohol, melts at approximately 197°–198°.

B. 2-tert.-Butyl-N-[2-(p-tert.-butylphenylthio)ethyl]-N-nitrosoglycine. Substitution of 58 parts of 2-tert.-butyl-N-[2-(p-tert.-butylphenylthio)ethyl]glycine for the N-[2-(p-tolylthio)ethyl]alanine called for in Example 7B, and increasing the amount of hydrochloric acid to 35 parts, affords, by the procedure detailed in the aforesaid example, 2-tert.-butyl-N-[2-(p-tert.-butylphenylthio)ethyl]-N-nitrosoglycine.

C. 4-tert.-Butyl-3-[2-(p-tert.-butylphenylthio)ethyl]-sydnone. A mixture of 2-tert.-butyl-N-[2-(p-tert.-butylphenylthio)ethyl]-N-nitrosoglycine and 325 parts of acetic anhydride is maintained at room temperatures under nitrogen for 4 days, then poured into 500 parts of water. The resultant mixture is stirred for 2 hours at room temperatures, then extracted with dichloromethane. The extract is consecutively washed with water, saturated aqueous sodium bicarbonate, and water, then stripped of solvent by vacuum distillation. The residue is 4-tert.-butyl-3-[2-(p-tert.-butylphenylthio)ethyl]sydnone which, recrystallized from a mixture of ethyl alcohol and ether, melts at approximately 86°–87°.

EXAMPLE 10

A. N-[4-(m-tert.-Butylphenylthio)butyl]alanine. Substitution of 39 parts of 4-[(m-tert.-butylphenyl)thio]butylamine and 25 parts of 2-bromopropionic acid for the 2-(phenylthio)ethylamino and 2-bromoactic acid called for in Example 2A, and decreasing the amount of tert.-butyl alcohol to 545 parts, affords, by the procedure detailed in the aforesaid example, N-[4-(m-tert.-butylphenylthio)butyl]alanine.

B. N-[4-(m-tert.-Butylphenylthio)butyl]-N-nitrosoalanine. Substitution of 44 parts of N-[4-(m-tert.-butylphenylthio)butyl]alanine for the N-[2-(p-tert.-butylphenylthio)ethyl]alanine called for in Example 8B affords, by the procedure there detailed, N-[4-(m-tert.-butylphenylthio)butyl]-N-nitrosoalanine.

C. 3-[4-(m-tert.-Butylphenylthio)butyl]-4-methylsydnone. Substitution of 17 parts of N-[4-(m-tert.-butylphenylthio)butyl]-N-nitrosoalanine for the N-nitroso-N-[2-(p-tolylthio)ethyl]alanine called for in Example 7C affords, by the procedure there detailed, 3-[4-(m-tert.-butylphenylthio)butyl]-4-methylsydnone. The product has the formula

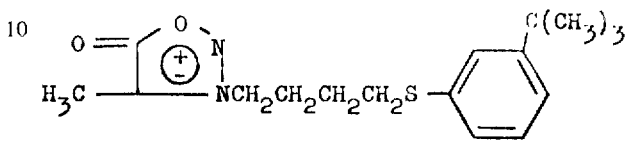

EXAMPLE 11

A. N-[2-(o-tert.-Butylphenylthio)ethyl]alanine. Substitution of 34 parts of 2-[(o-tert.-butylphenyl)thio]ethylamine and 25 parts of 2-bromopropionic acid for the 2-[(p-chlorophenyl)thio]ethylamine and bromoacetic acid, respectively, called for in Example 2A, and decreasing the amount of tert.-butyl alcohol to 545 parts, affords, by the procedure detailed in the aforesaid example, N-[2-(o-tert.-butylphenylthio)ethyl]alanine.

B. N-[2-(o-tert.-Butylphenylthio)ethyl]-N-nitrosoalanine. Substitution of 40 parts of N-[2-(o-tert.-butylphenylthio)ethyl]alanine for the N-[2-(p-tert.butylphenylthio)ethyl]alanine called for in Example 8B affords, by the procedure there detailed, N-[2-(o-tert.-butylphenylthio)ethyl]-n-nitrosoalanine.

3. 3-[2-(o-tert.-Butylphenylthio)ethyl]-4-methylsydnone. Substitution of 20 parts of N-[2-(o-tert.-butylphenylthio)ethyl]-N-nitrosoalanine for the N-nitroso-N-[2-(p-tolylthio)ethyl]alanine called for in Example 7C affords, by the procedure there detailed, 3-[2-(o-tert.-butylphenylthio)ethyl]-4-methylsydnone.

EXAMPLE 12

A. N-[2-(p-Fluorophenylthio)ethyl]alanine. Substitution of 29 parts of 2-[(p-fluorophenyl)thio]ethylamine and 26 parts of 2-bromopropionic acid for the 2-[(p-chlorophenyl)thio]ethylamine and bromoacetic acid, respectively, called for in Example 2A affords, by the procedure there detailed, N-[2-(p-fluorophenylthio)ethyl]alanine.

B. N-[2-(p-Fluorophenylthio)ethyl]-N-nitrosoalanine. Substitution of 35 parts of N-[2-(p-fluorophenylthio)ethyl]alanine for the N-[2-(p-tert.-butylphenylthio)ethyl]alanine called for in Example 8B affords, by the procedure there detailed, N-[2-(p-fluorophenylthio)ethyl]-N-nitrosoalanine.

C. 3-[2-(p-Fluorophenylthio)ethyl]-4-methylsydnone. Substitution of 15 parts of N-[2-(p-fluorophenylthio)ethyl-N-nitrosoalanine for the N-nitroso-N-[2-(p-tolylthio)ethyl]alanine called for in Example 7C affords, by the procedure there detailed, 3-[2-(p-fluorophenylthio)ethyl]-4-methylsydnone.

EXAMPLE 13

A. N-[2-(o-Fluorophenylthio)ethyl]alanine. Substitution of 29 parts of 2-[ethylamine and 26 parts of 2-bromopropionic acid for the 2-[(p-chlorophenyl)thio]ethylamine and bromoacetic acid, respectively, called for in Example 2A, and decreasing the amount of tert.-butyl alcohol to 390 parts, affords, by the procedure detailed in the aforesaid example, N-[2-(o-fluorophenylthio)ethyl]alanine.

B. N-[2-(o-Fluorophenylthio)ethyl]-N-nitrosoalanine. Substitution of 35 parts of N-[2-(o-fluorophenylthio)ethyl]alanine for the N-[2-(p-tert.-butylphenylthio)ethyl]alanine called for in Example 8B affords, by the procedure there detailed, N-[2-(o-fluorophenylthio)ethyl]-N-nitrosoalanine.

C. 3-[2-(o-Fluorophenylthio)ethyl]-4-methylsydnone. Substitution of 16 parts of N-[2-(o-fluorophenylthio)ethyl]-N-nitrosoalanine for the N-nitroso-N-[2-(p-tolylthio)ethyl]alanine called for in Example 7C affords, by the procedure there detailed, 3-[2-(o-fluorophenylthio)ethyl]-4-methylsydnone.

EXAMPLE 14

A. N-[2-(p-Chlorophenylthio)ethyl]alanine. Substitution of 32 parts of 2-[(p-chlorophenyl)thio]ethylamine and 26 parts of 2-bromopropionic acid for the 2-[(p-chlorophenyl)thio]ethylamine and bromoacetic acid, respectively, called for in Example 2A, and decreasing the amount of tert.-butyl alcohol to 390 parts, affords, by the procedure detailed in the aforesaid example, N-[2-(p-chlorophenylthio)ethyl]alanine which, recrystallized from water, melts at approximately 219°–220°.

B. N-[2-(p-Chlorophenylthio)ethyl]-N-nitrosoalanine. A mixture of 42 parts of N-[2-(p-chlorophenylthio)ethyl]alanine, 11 parts of sodium nitrite, 250 parts of water, and 135 parts of dichloromethane is stirred at 0° for 2 hours, whereupon approximately 50 parts of hydrochloric acid is introduced. A further 11 parts of sodium nitrite is then added portionwise with stirring during 4 hours at 0°, after which stirring is continued at 0°–5° for 15 hours. The resultant mixture is filtered, the filtrate is extracted with dichloromethane, and the extract is washed with water and then extracted in turn with saturated aqueous sodium bicarbonate. The bicarbonate extract is acidified with concentrated hydrochloric acid, and the resultant mixture is extracted with dichloromethane. Evaporation of solvent affords N-[2-(p-chlorophenylthio)ethyl]-N-nitrosoalanine as the residue.

C. 3-[2-(p-Chlorophenylthio)ethyl]-4-methylsydnone. Substitution of 23 parts of N-[2-(p-chlorophenylthio)ethyl]-N-nitrosoalanine for the N-[2-(p-chlorophenylthio)ethyl]-N-nitrosoglycine called for in Example 2C affords, by the procedure there detailed, 3-[2-(p-chlorophenylthio)ethyl]-4-methylsydnone melting at approximately 77°–78°.

EXAMPLE 15

A. N-[2-(o-Bromophenylthio)ethyl]alanine. Substitution of 42 parts of 2-[(o-bromophenyl)thio]ethylamine and 26 parts of 2-bromopropionic acid for the 2-[(p-chlorophenyl)thio]ethylamine and bromoacetic acid, respectively, called for in Example 2A, and decreasing the amount of tert.-butyl alcohol to 390 parts, affords, by the procedure detailed in the aforesaid example, N-[2-(o-bromophenylthio)ethyl]alanine.

B. N-[2-(o-Bromophenylthio)ethyl]-N-nitrosoalanine. Substitution of 49 parts of N-[2-(o-bromophenyl)ethyl]alanine for the N-[2-(p-chlorophenylthio)ethyl]alanine called for in Example 14B affords, by the procedure there detailed, N-[2-(o-bromophenylthio)ethyl]-N-nitrosoalanine.

C. 3-[2-(o-Bromophenylthio)ethyl]-4-methylsydnone. Substitution of 20 parts of N-[2-(o-bromophenylthio)ethyl]-N-nitrosoalanine for the N-nitroso-N-[2-(p-tolylthio)ethyl]alanine called for in Example 7C affords, by the procedure there detailed, 3-[2-(o-bromophenylthio)ethyl]-4-methylsydnone.

EXAMPLE 16

A. N-[2-(p-Iodophenylthio)ethyl]alanine. Substitution of 48 parts of 2-[(p-iodophenyl)thio]ethylamine and 26 parts of 2-bromopropionic acid for the 2-[(p-chlorophenyl)thio]ethylamine and bromoacetic acid, respectively, called for in Example 2A, and decreasing the amount of tert.-butyl alcohol to 390 parts, affords, by the procedure detailed in the aforesaid example, N-[2-(p-iodophenylthio)ethyl]alanine.

B. N-[2-(p-Iodophenylthio)ethyl]-N-nitrosoalanine. Substitution of 56 parts of N-[2-(p-iodophenylthio)ethyl]alanine for the N-[2-(p-chlorphenylthio)ethyl]alanine called for in Example 14B, affords, by the procedure there detailed, N-[2-(p-iodophenylthio)ethyl]-N-nitrosoalanine.

C. 3-[2-(p-Iodophenylthio)ethyl]-4-methylsydnone. Substitution of 23 parts of N-[2-(p-iodophenylthio)ethyl]-N-nitrosoalanine for the N-nitroso-N-[2-(p-tolylthio)ethyl]alanine called for in Example 7C affords, by the procedure there detailed, 3-[2-(p-iodophenylthio)ethyl]-4-methylsydnone.

EXAMPLE 17

A. N-[2-(2,5-Dichlorophenylthio)ethyl]alanine. Substitution of 43 parts of 2-[(2,5-dichlorophenyl)thio]ethylamine and 30 parts of 2-bromopropionic acid for the 2-[(p-chlorophenyl)thio]ethylamine and bromoacetic acid, respectively, called for in Example 2A, and increasing the amount of sodium methoxide to 10 parts, affords, by the procedure there detailed, N-[2-(2,5-dichlorophenylthio)ethyl]alanine.

B. N-[2-(2,5-dichlorophenylthio)ethyl]-N-nitrosoalanine. To a mixture of 40 parts of N-[2-(2,5-dichlorophenylthio)ethyl]alanine, 30 parts of concentrated hydrochloric acid, 300 parts of water, and 270 parts of dichloromethane is slowly added, with stirring at 0°, a solution of 14 parts of sodium nitrite in 50 parts of water. Stirring at 0° is continued for 4 hours after the addition is complete, whereupon the aqueous phase is separated and extracted with dichloromethane. The extract is combined with the organic phase of the reaction mixture, and the resultant solution is washed with water and then extracted with saturated aqueous sodium bicarbonate. The bicarbonate extract is acidified, and the resultant mixture is extracted with dichloromethane. Evaporation of solvent affords N-[2-(2,5-dichlorophenylthio)ethyl]-N-nitrosoalanine as the residue.

C. 3-[2-(2,5-Dichlorophenylthio)ethyl]-4-methylsydnone. Substitution of 24 parts of N-[2-(2,5-dichlorophenylthio)ethyl]-N-nitrosoalanine for the N-[2-(p-chlorophenylthio)ethyl]-N-nitrosoglycine called for in Example 2C affords, by the procedure there detailed, 3-[2-(2,5-dichlorophenylthio)ethyl]-4-methylsydnone melting at approximately 74°–75°.

EXAMPLE 18

A. N-[2-(3,4-Dichlorophenylthio)ethyl]alanine. Substitution of 43 parts of 2-[(3,4-dichlorophenyl)thio]-ethylamine and 30 parts of 2-bromopropionic acid for the 2-[(p-chlorophenyl)thio]ethylamine and bromoacetic acid, respectively, called for in Example 2A, and reducing the amount of sodium methoxide to 10 parts, affords, by the procedure detailed in the aforesaid example, N-[2-(3,4-dichlorophenylthio)ethyl]alanine.

B. N-[2-(3,4-Dichlorophenylthio)ethyl]-N-nitrosoalanine. Substitution of 36 parts of N-[2-(3,4-dichlorophenylthio)ethyl]alanine for the N-[2-(2,5-dichlorophenylthio)ethyl]alanine called for in Example 17B affords, by the procedure there detailed, N-[2-(3,4-dichlorophenylthio)ethyl]-N-nitrosoalanine.

C. 3-[2-(3,4-Dichlorophenylthio)ethyl]-4-methylsydnone. A mixture of 13 parts of N-[2-(3,4-dichlorophenylthio)ethyl]-N-nitrosoalanine and 215 parts of acetic anhydride is maintained at room temperatures under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum disillation. The residue is 3-[2-(3,4-dichlorophenylthio)ethyl]-4-methylsydnone which, recrystallized from ethyl acetate, melts at approximately 85°.

EXAMPLE 19

A. N-[2-(p-Methoxyphenylthio)ethyl]alanine. Substitution of 39 parts of 2-[(p-methoxyphenyl)thio]-ethylamine and 33 parts of 2-bromopropionic acid for the 2-[(p-chlorophenyl)thio]ethylamine and bromoacetic acid called for in Example 2A, and increasing the amounts of sodium methoxide and tert.-butyl alcohol to 12 and 700 parts, respectively, affords, by the procedure detailed in the aforesaid example, N-[2-(p-methoxyphenylthio)ethyl]-alanine.

B. N-[2(p-Methoxyphenylthio)ethyl]-N-nitrosoalanine. A mixture of 40 parts of N-[2-(p-methoxyphenylthio)ethyl]alanine, 14 parts of sodium nitrite, 300 parts of water, and 270 parts of dichloromethane is stirred at 0° for 2 hours, whereupon 60 parts of concentrated hydro-chloric acid is introduced. A further 14 parts of sodium nitrite is then added portionwise with stirring during 4 hours at 0°, after which stirring is continued at 0°-5° for 15 hours. The resultant mixture is filtered, the filtrate is extracted with dichloromethane, and the extract is washed with water and then extracted in turn with aqueous sodium bicarbonate. The bicarbonate extract is acidified with concentrated hydrochloric acid, and the resultant mixture is extracted with dichloromethane. Evaporation of solvent affords N-[2-(p-methoxyphenylthio)-ethyl]-N-nitrosoalanine as the residue.

C. 3-[2-(p-Methoxyphenylthio)ethyl]-4-methylsydnone. A mixture of 14 parts of N-[2-(p-methoxyphenylthio)ethyl]-N-nitrosoalanine and 215 parts of acetic anhydride is maintained at room temperatures under nitrogen for 4 days, then poured into 500 parts of water. The resultant mixture is stirred for 2 hours at room temperatures, then extracted with dichloromethane. The dichlormethane extract is consecutively washed with water, saturated aqueous sodium bicarbonate, and water, then stripped of solvent by vacuum distillation. The residue is 3-[2-(p-methoxyphenylthio)ethyl]-4-methylsydnone which, recrystallized from a mixture of acetone and ether, melts at approximately 60°-61°.

EXAMPLE 20

A. N-[2-(o-Ethoxyphenylthio)ethyl]alanine. Substitution of 42 parts of 2-[(o-ethoxyphenyl)thio]-ethylamine and 33 parts of 2-bromopropionic acid for the 2[(p-chlorophenyl)thio]ethylamine and bromoacetic acid called for in Example 2A, and increasing the amounts of sodium methoxide and tert.-butyl alcohol to 10 and 700 parts, respectively, affords, by the procedure detailed in the aforesaid example, N-[2-(o-ethoxyphenylthio)ethyl]alanine.

B. N-[2(o-Ethoxyphenylthio)ethyl]-N-nitrosoalanine. Substitution of 62 parts of N-[2-(o-ethoxyphenylthio)ethyl]alanine for the N-[2-(2,5-dichlorophenylthio)ethyl]alanine called for in Example 17B, and decreasing the amounts of sodium nitrite and hydrochloric acid to 12 to 15 parts, respectively, affords, by the procedure detailed in the aforesaid example, N-[2-(o-ethoxyphenylthio)-ethyl]-N-nitrosoalanine.

C. 3-[2-(o-Ethoxyphenylthio)ethyl]-4-methylsydnone. Substitution of 25 parts of N-[2-(o-ethoxyphenylthio)ethyl]-N-nitrosoalanine for the N-nitroso-N-[2-(p-tolythio)ethyl]alanine called for in Example 7C affords, by the procedure there detailed, 3-[2-(o-ethoxyphenylthio)ethyl]-4-methylsydnone.

EXAMPLE 21

A. N-[2-(p-Nitrophenylthio)ethyl]alanine. A mixture of 50 parts of 2-[(p-nitrophenyl)thio]ethylamine hydrochloride, 33 parts of 2-bromopropionic acid, 23 parts of sodium methoxide, and 545 parts of tert.-butyl alcohol, is heated at the boiling point under reflux for 12 hours, then cooled to room temperature. Insoluble solids are filtered out, washed with ether and dried in air. The product thus isolated is N-[2-(p-nitrophenylthio)-ethyl]alanine.

B. N-[2-(p-Nitrophenylthio)ethyl]-N-nitrosoalanine. To a mixture of 62 parts of N-[2-(p-nitrophenylthio)ethyl]-alanine, approximately 20 parts of concentrated hydrochloric acid, 250 parts of water, and 270 parts of dichloromethane is slowly added, with stirring at 0°, a solution of 12 parts of sodium nitrite in 50 parts of water. Stirring at 0° is continued for 4 hours after the addition is complete, whereupon the aqueous phase is separated and extracted with dichloromethane. The extract is combined with the organic phase of the reaction mixture, and the resultant solution is washed with water and then extracted with saturated aqueous sodium bicarbonate. The bicarbonate extract is acidified, and the resultant mixture is extracted with dichloromethane. Evaporation of solvent affords N-[2-(p-nitrophenylthio)ethyl]-N-nitrosoalanine as the residue.

C. 3-[2-(p-Nitrophenylthio)ethyl]-4-methylsydnone. Substitution of 31 parts of N-[2-(p-nitrophenylthio)ethyl]-N-nitrosoalanine for the N-[2-(3,4-dichlorophenylthio)ethyl]-N-nitrosoalanine called for in Example 18C, and increasing the amount of acetic anhydride to 325 parts, affords, by the procedure detailed in the aforesaid example, 3-[2-(p-nitrophenylthio)ethyl]-4-methylsydnone melting at 205°-207°.

EXAMPLE 22

4-Methyl-3-[2-(phenylsulfinyl)ethyl]sydnone. A mixture of 10 parts of 4-methyl-3-[2-(phenylthio)ethyl]-sydnone and 22 parts of sodium periodate in approximately 300 parts of 1:6 (by volume) methyl alcohol: water is stirred at 4°–8° for 24 hours. Insoluble solids are filtered out and washed with chloroform. Filtrate and wash liquor are combined, and the resultant solution is washed with water and then stripped of solvent by vacuum distillation, leaving 4-methyl-3-[2-(phenylsulfinyl)ethyl]-sydnone as the residue.

EXAMPLE 23

A. N-[3-(Phenylthio)propyl]alanine. Substitution of 40 parts of 3-(phenylthio)propylamine and 37 parts of 2-bromopropionic acid for the 2-[(phenylthio)propylamine and 37 parts of 2-bromopropionic acid for the 2-[(p-chlorophenyl)thio]-ethylamine and bromoacetic acid called for in Example 2A, and increasing the amounts of sodium methoxide and tert.-butyl alcohol to 13 and 780 parts, respectively, affords, by the procedure detailed in the aforesaid example, N-[3-(phenylthio)propyl]alanine which, recrystallized from water, melts at approximately 265°.

B. N-Nitroso-N-[3-(phenylsulfinyl)propyl]alanine. Substitution of 85 parts of N-[3-(phenylthio)propyl]alanine for the barium N-[2-(phenylthio)ethyl]glycinate called for in Example 1C, and increasing the amounts of sodium nitrite, hydrochloric acid, and water to 34, 60, and 300 parts, respectively, affords, by the procedure detailed in the aforesaid example, N-nitroso-N-[3-(phenylsulfinyl)-propyl]alanine.

C. 4-Methyl-3-[3-(phenylsulfinyl)propyl]sydnone. A mixture of 34 parts of N-nitroso-N-[3-(phenylsulfinyl)-propyl]alanine and 215 parts of acetic anhydride is maintained at room temperature under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum distillation. The residue is 4-methyl-3-[3-(phenylsulfinyl)propyl]sydnone which, recrystallized from acetone, melts at approximately 128°.

EXAMPLE 24

A. N-[4-(Phenylthio)butyl]alanine. Substitution of 43 parts of 4-(phenylthio)butylamine and 37 parts of 2-bromopropionic acid for the 2-[(p-chlorophenyl)thio]-ethylamine and bromoacetic acid called for in Example 2A, and increasing the amounts of sodium methoxide and tert.-butyl alcohol to 13 and 780 parts, respectively, affords, by the procedure detailed in the aforesaid example, N-[4-(phenylthio)butyl]alanine.

B. N-Nitroso-N-[4-(phenylsulfinyl)butyl]alanine. Substitution of 90 parts of N-[4-(phenylthio)butyl]alanine for the barium N-[2-(phenylthio)ethyl]glycinate called for in Example 1C, and increasing the amounts of sodium nitrite, hydrochloric acid, and dichloromethane to 34, 70, and 200 parts, respectively, affords, by the procedure detailed in the aforesaid example, N-nitroso-N-[4-(phenylsulfinyl)butyl]alanine.

C. 4-Methyl-3-[4-(phenylsulfinyl)butyl]sydnone. Substitution of 21 parts of N-nitroso-N-[4-(phenylsulfinyl)-butyl]alanine for the N-nitroso-N-[2-(p-tolylthio)ethyl]-alanine called for in Example 7C affords, by the procedure there detailed, 4-methyl-3-[4-(phenylsulfinyl)butyl]sydnone.

EXAMPLE 25

A. N-[2-(Benzylthio)ethyl]alanine. Substitution of 40 parts of 2-(benzylthio)ethylamine for the 2-[(p-nitrophenyl)thio]ethylamine hydrochloride called for in Example 21A, and decreasing the amounts of 2-bromopropionic acid and sodium methoxide to 31 and 11 parts, respectively, affords, by the procedure detailed in the aforesaid example, N-[2-(benzylthio)ethyl]alanine which, recrystallized from water, melts at approximately 219°–220°.

B. N-[2-(Benzylsulfinyl)ethyl]-N-nitrosoalanine. A mixture of 86 parts of N-[2-(benzylthio)ethyl]alanine, 25 parts of sodium nitrite, 600 parts of water, and 270 parts of dichloromethane is stirred at 0° for 2 hours, whereupon 95 parts of concentrated hydrochloric acid is introduced. A further 25 parts of sodium nitrite is then added portionwise with stirring during 4 hours at 0°, after which stirring is continued at 0°–5° for 15 hours. The resultant mixture is filtered, the filtrate is extracted with dichloromethane, and the extract is washed with water and then extracted in turn with saturated aqueous sodium bicarbonate. The bicarbonate extract is acidified with concentrated hydrochloric acid, and the resultant mixture is extracted with dichloromethane. Evaporation of solvent affords N-[2-(Benzylsulfinyl)ethyl]-N-nitrosoalanine as the residue.

C. 3-[2-(Benzylsulfinyl)ethyl]-4-methylsydnone. A mixture of 11 parts of N-[2-(benzylsulfinyl)ethyl]-N-nitrosoalanine and 160 parts of acetic anhydride is maintained at room temperature under nitrogen for 4 days, then poured into 500 parts of water. The resultant mixture is stirred for 2 hours at room temperatures, then extracted with dichloromethane. The dichloromethane extract is consecutively washed with water, saturated aqueous sodium bicarbonate, and water, then stripped of solvent by vacuum distillation. The residue is 3-[2-(benzylsulfinyl)-ethyl]-4-methylsydnone which, recrystallized from acetone, melts at 82°–84°. The product has the formula

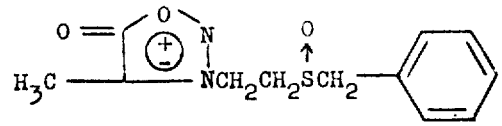

EXAMPLE 26

3-[2-(o-tert.Butylphenylsulfinyl)ethyl]-4-methylsydnone. Substitution of 10 parts of 3-[2-(o-tert.-butylphenylthio)ethyl]-4-methylsydnone for the 4-methyl-3-[2-(phenylthio)ethyl]sydnone called for in Example 22 affords, by the procedure there detailed, 3-[2-(o-tert.-butylphenylsulfinyl)ethyl]-4-methylsydnone.

EXAMPLE 27

A. N-Nitroso-N-[2-(p-tolylsulfinyl)ethyl]alanine. Substitution of 19 parts of N-[2-(p-tolylthio)ethyl]alanine for the N-[2-(phenylthio)ethyl]alanine called for in Example 5B, and decreasing the amounts of sodium nitrite and acetic acid to 7 and 210 parts, respectively, affords, by the procedure detailed in the aforesaid example, N-nitroso-N-[2-(p-tolylsulfinyl)ethyl]alanine.

B. 4-Methyl-3-[2-(p-tolylsulfinyl)ethyl]sydnone. Substitution of 19 parts of N-nitroso-N-[2-(p-tolylsulfinyl)-ethyl]alanine for the N-nitroso-N-[3-(phenylsulfinyl)propyl]-alanine called for in Example 23C, and decreasing the amount of acetic anhydride to 160 parts, affords, by the procedure detailed in the aforesaid example, 4-methyl-3-[2-(p-tolylsulfinyl)ethyl]sydnone, melting at approximately 103°.

EXAMPLE 28

3-[2-(p-tert.-Butylphenylsulfinyl)ethyl]-4-methylsydnone. Substitution of 20 parts of 3-[2-(p-tert.-butylphenylthio)ethyl]-4-methylsydnone and approximately 650 parts of 1:6 (by volume) methyl alcohol:water for the 3-[2-(phenylthio)ethyl]sydnone and 1:2 methyl alcohol:water called for in Example 3, respectively, affords, by the procedure there detailed, 3-[2-(p-tert.-butylphenylsulfinyl)ethyl]-4-methylsydnone melting at 101°–103°.

EXAMPLE 29

3-[2-(o-Fluorophenylsulfinyl)ethyl]-4-methylsydnone. Substitution of 3 parts of 3-[2-(o-fluorophenylthio)ethyl]-4-methylsydnone and approximately 50 parts of 1:2 (by volume) methyl alcohol:water for the 4-methyl-3-[2-(phenylthio)ethyl]sydnone and 1:6 methyl alcohol:water, respectively, called for in Example 22, and decreasing the amount of sodium periodate to 8 parts, affords, by the procedure detailed in the aforesaid example, 3-[2-(o-fluorophenylsulfinyl)ethyl]-4-methylsydnone.

EXAMPLE 30

3-[2-(p-Chlorophenylsulfinyl)ethyl]-4-methylsydnone. Substitution of 3 parts of 3-[2-(p-chlorophenylthio)ethyl]-4-methylsydnone and approximately 50 parts of 1:4 (by volume) methyl alcohol:water for the 3-[2-(phenylthio)ethyl]sydnone and 1:2 methyl alcohol:water, respectively, called for in example 3, and decreasing the amount of sodium periodate to 7 parts, affords, by the procedure detailed in the aforesaid example, 3-[2-(p-chlorophenylsulfinyl)ethyl]-4-methylsydnone melting at 80°–82°.

EXAMPLE 31

3-[2-(p-Iodophenylsulfinyl)ethyl]-4-methylsydnone. Substitution of 4 parts of 3-[2-(p-iodophenylthio)ethyl]-4-methylsydnone and approximately 100 parts of 1:4 (by volume) methyl alcohol:water for the 4-methyl-3-]2-(phenylthio)ethyl]sydnone and 1:6 methyl alcohol:water respectively, called for in Example 22, and decreasing the amount of sodium periodate to 8 parts, affords, by the procedure detailed in the aforesaid example, 3-[2-(p-iodophenylsulfinyl)ethyl]-4-methylsydnone.

EXAMPLE 32

4Methyl-3-[(p-tolylsulfonyl)ethyl]sydnone. A mixture of 5 parts of 4-methyl-3-[2-(p-tolylthio)ethyl]sydnone and 21 parts of sodium periodate in approximately 160 parts of 1:5 (by volume) methyl alcohol:water is stirred at room temperatures for 4 days. Insoluble solids are filtered out and washed with chloroform. Filtrate and wash liquor are combined; and the resultant solution is washed with water and then stripped of solvent by vacuum distillation, leaving 4-methyl-3-[(p-tolylsulfonyl)-ethyl]sydnone as the residue.

EXAMPLE 33

3-[2-(p-tert.-Butylphenylsulfonyl)ethyl]-4-methylsydnone. A mixture of 20 parts of 3-[2-(p-tert.-butylphenylthio)ethyl]-4-methylsydnone and 84 parts of sodium nitrite in approximately 600 parts of 1:5 (by volume) methyl alcohol:water is stirred at room temperatures for 4 days. Insoluble solids are filtered out and washed with chloroform. Filtrate and wash liquor are combined; and the resultant solution is washed with water and then stripped of solvent by vacuum distillation, leaving 3-]2-(p-tert.-butylphenylsulfonyl)ethyl]-4-methylsydnone as the residue. Recrystallized from a mixture of acetone and ether, the product melts at 135°–137°.

EXAMPLE 34

3-[2-(o-tert.-Butylphenylsulfonyl)ethyl]-4-methylsydnone. Substitution of 5 parts of 3-[2-o-tert.-butylphenylthio)ethyl]-4-methylsydnone for the 4-methyl-3-[2-(p-tolylthio)ethyl]sydnone called for in Example 32 affords, by the procedure there detailed, 3-[2-(o-tert.-butylphenylsulfonyl)ethyl]-4-methylsydnone.

EXAMPLE 35

A. 2-Phenyl-N-[2-(phenylthio)ethyl]glycine. A mixture of 35 parts of 2-(phenylthio)ethylamine, 49 parts of α-bromophenylacetic acid, 9 parts of sodium hydroxide, and 315 parts of ethyl alcohol is heated at the boiling point under reflux for 20 hours, then chilled. Insoluble solids are filtered out, washed with hexane, and dried in air. The product thus isolated is 2-phenyl-N-[2-(phenylthio)ethyl]glycine melting at approximately 205°–206°.

B. N-nitroso-2-phenyl-N-[2-(phenylthio)ethyl]glycine. Substitution of 35 parts of 2-phenyl-N-[2-(phenylthio)ethyl]glycine for the N-[2-(phenylthio)ethyl]alanine called for in Example 5B, and decreasing the amounts of sodium nitrite and acetic acid to 5 and 200 parts, respectively, affords, by the procedure detailed in the aforesaid example, N-nitroso-2-phenyl-N-[2-(phenylthio)ethyl]glycine.

C. 4-Phenyl-3-[2-(phenylthio)ethyl]sydnone. Substitution of 12 parts of N-nitroso-2-phenyl-N-[2-(phenylthio)ethyl]glycine for the N-nitroso-N-[2-(phenylthio)ethyl]alanine called for in Example 5C affords, by the procedure there detailed, 4-phenyl-3-[2-(phenylthio)ethyl]sydnone melting at approximately 81°–82°.

EXAMPLE 36

4-Bromo-3-[2-(phenylthio)ethyl]sydnone. To a solution of 40 parts of 3-[2-(phenylthio)ethyl]sydnone and 40 parts of potassium acetate in 420 parts of acetic acid is slowly added, with stirring, a solution of 28 parts of bromine in 105 parts of acetic acid. Stirring is continued until the reaction mixture becomes colorless, whereupon the mixture is dumped into 500 parts of water. Insoluble solids are filtered out and recrystallized from a mixture of acetone and ether to give 4-bromo-3-[2-(phenylthio)ethyl]sydnone as a colorless solid melting at 86°–88°.

EXAMPLE 37

A. N-[2-(2-Naphthylthio)ethyl]alanine. Substitution of 50 parts of 2-(2-naphthylthio)ethylamine hydrochloride and 32 parts of 2-bromopropionic acid for the 2-[(p-chlorophenyl)thio]ethylamine and bromoacetic acid called for in Example 2A, and increasing the amounts of sodium methoxide and tert.-butyl alcohol to 23 and 1,000 parts, respectively, affords, by the procedure detailed in the aforesaid example, N-[2-(2-naphthylthio)ethyl]alanine which, recrystallized from methyl alcohol, melts at 218°–220°.

B. N-[2-(2-Naphthylthio)ethyl]-N-nitrosoalanine. Substitution of 57 parts of N-[2-(2-naphthylthio)ethyl]alanine for the N-[2-(p-tolylthio)ethyl]alanine called for in Example 7B, and increasing the amount of water to 600 parts, affords, by the procedure detailed in the aforesaid example, N-[2-(2-naphthylthio)ethyl]-N-nitrosoalanine.

C. 4-Methyl-3-[2-(2-naphthylthio)ethyl]sydnone. Substitution of 16 parts of N-[2-(2-naphthylthio)ethyl]-N-nitrosoalanine for the N-[2-(p-chlorophenylthio)ethyl]-N-nitrosoglycine called for in Example 2C, and increasing the amount of acetic anhydride to 325 parts, affords, by the procedure detailed in the aforesaid example, 4-methyl-3-[2-(2-naphthylthio)ethyl]sydnone melting at approximately 81°–82°. The product has the formula

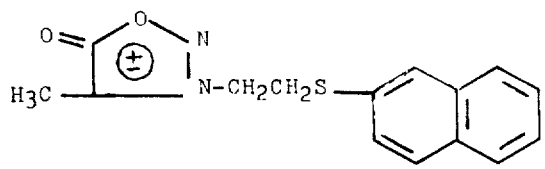

EXAMPLE 38

A. N-[2-(p-Chlorophenylthio)-1-methylethyl]alanine. Substitution of 48 parts of 2-[(p-chlorophenyl)-thio]-1-methylethylamine and 31 parts of 2-bromopropionic acid for the 2-[(p-chlorophenyl)-thio]ethylamine and bromoacetic acid called for in Example 2A, and increasing the amounts of sodium methoxide and tert.-butyl alcohol to 22 and 780 parts, respectively, affords, by the procedure detailed in the aforesaid example, N-[2-(p-chlorophenylthio)-1-methylethyl]alanine.

B. N-[2-(p-Chlorophenylthio)-1-methylethyl]-N-nitrosoalanine. Substitution of 42 parts of N-[2-(p-chlorophenylthio)-1-methylethyl]alanine for the N-[2-(p-tolylthio)ethyl]alanine called for in Example 7B, and decreasing the amounts of water and dichloromethane to 200 and 270 parts, respectively, affords, by the procedure detailed in the aforesaid example, N-[2-(p-chlorophenylthio)-1-methylethyl]-N-nitrosoalanine.

C. 3-[2-(p-Chlorophenylthio)-1-methylethyl]-4-methylsydnone. Substitution of 20 parts of N-[2-(p-chlorophenylthio)-1-methylethyl]-N-nitrosoalanine for the N-nitroso-N-[2-(p-tolylthio)ethyl]alanine called for in example 7C affords, by the procedure there detailed, 3-[2-(p-chlorophenylthio)-1-methylethyl]-4-methylsydnone. The product has the formula

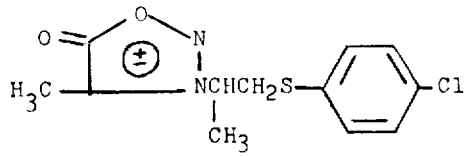

EXAMPLE 39

A. N-[2-(p-tert.-Butylphenylthio)ethyl]3-carbomethoxyalanine. 28 Parts of maleic anhydride in 80 parts of methanol is refluxed for about 40 minutes. Then the excess methanol is removed by distillation and the residue remaining is cooled to about 0° and treated with 70 parts of triethylamine, added in one portion. This solution is stirred and 52 parts of 2-(p-tert.-butylphenylthio)ethylamine is added. The mixture solidifies after about 10 minutes upon warming. After filtering, the filter cake is broken, washed with ethyl acetate and recrystallized from methanol to give N-[2-(p-tert.-butylphenylthio)ethyl]-3-carbomethoxyalanine, melting at about 208°.

B. N-]2-(p-tert.-Butylphenylthio)ethyl]-3-carbomethoxy-N-nitrosolalanine. Substitution of 50 parts of N-[2-(p-tert.-butylphenylthio)ethyl]-3-carbomethoxyalanine, 600 parts of water, 400 parts of dichloromethane, 24 parts of concentrated hydrochloric acid, and 15.5 parts of sodium nitrite in the procedure of Example 8B, and otherwise following the procedure detailed therein, affords, N-[2-(p-tert.-butylphenylthio)ethyl]-3-carbomethoxy-N-nitrosoalanine.

C. 3-[2-(p-tert.-Butylphenylthio)ethyl]-4-methoxycarbonylmethylsydnone. Substitution of 54 parts of N-[2-(p-tert.-butylphenylthio)ethyl]-3-carbomethoxy-N-nitrosoalanine and 840 parts of acetic anhydride in the procedure of Example 7B, and otherwise following the procedure detailed therein, affords 3-]2-(p-tert.-butylphenylthio)]-4-methoxycarbonylmethylsydnone.

EXAMPLE 40

3-[2-(p-tert.-Butylphenylthio)ethyl]-4-carboyxmethylsydnone. A solution consisting of 3 parts of 3-[2-(p-tert.-butylphenylthio)ethyl]-4-methoxycarbonylmethylsydnone, 80 parts of tetrahydrofuran, 30 parts of water and 1 part by volume of concentrated sulfuric acid is heated at 35°–40° under a nitrogen atmosphere for 5 days. After that time, the mixture is poured into water and extracted with benzene. After successively washing the extracts with water and saturated aqueous sodium bicarbonate, the basic extracts are acidified and extracted again with benzene. Then they are dried over anhydrous sodium sulfate and evaporated to dryness. The material remaining is recrystallized from isopropanol-water to give 3-[2-(p-tert.-butylphenylthio)ethyl]-4-carboxymethylsydnone, melting at about 137°.

EXAMPLE 41

A. N-(2-Phenoxyethyl)alanine. The procedure detailed in Example 2A is repeated using 32 parts of β-phenoxyethylamine, 36 parts of 2-bromopropionic acid, 26 parts of potassium t-butoxide and 600 parts of t-butanol, thus producing N-(2-phenoxyethyl)alanine.

B. N-(2-Phenoxyethyl)N-nitrosoalanine. The procedure detailed in Example 8B is repeated using 48 parts of N-(2-phenoxyethyl)alanine, 16 parts of sodium nitrite, 300 parts of water and 400 parts of dichloromethane, thus producing N-(2-phenoxyethyl)-N-nitrosoalanine.

C. 4-Methyl-3-(2-phenoxyethyl)sydnone. The procedure detailed in Example 7C is repeated using 14 parts of N-(2-phenoxyethyl)-N-nitrosoalanine and 210 parts of acetic anhydride, thereby affording 4-methyl-3-2-phenoxyethyl)sydnone, melting at about 99°–100°. That product is represented by the following structural formula

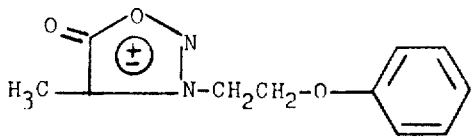

EXAMPLE 42

A. N-[3-(p-Chlorophenylthio)-2-propyl]alanine. Substitution of 48 parts of 3-(p-chlorophenylthio)-2-propylamine hydrochloride, 45 parts of t-potassium butoxide, 31 parts of 2-bromopropionic acid and 600 parts by volume of t-butanol, in the procedure of Example 2A affords N-[3-(p-chlorophenylthio)-2-propyl]alanine.

B. N-[3-(p-Chlorophenylthio)-2-propyl]-N-nitrosoalanine. Substitution of 14 parts of N-[3-(p-chlorophenylthio)-2-propyl]alanine, 5 parts of sodium nitrite, 200 parts of water, and 280 parts of dichloromethane in the procedure of Example 8B affords N-[3-(p-chlorophenylthio)-2-propyl]-N-nitrosoalanine.

C. 3-[3-(p-Chlorophenylthio)-2-propyl]-4-methylsydnone. Substitution of 13 parts of N-[3-(p-chlorophenylthio)-2-propyl]-N-nitrosoalanine and 150 parts of acetic anhydride in the procedure of Example 7C, affords 3-[3-(p-chlorophenylthio)-2-propyl]-4-methylsydnone, melting at about 84°–85°.

EXAMPLE 43

A. N-[2-(p-Bromophenylthio)ethyl]alanine. Repetition of the procedure detailed in Example 2A while utilizing 161 parts of 2-(p-bromophenyl)ethylamine, 134 parts of 2-bromopropionic acid, 65 parts of sodium methoxide and 2800 parts by volume of t-butanol, affords N-[2-(p-bromophenylthio)ethyl]alanine.

B. N-[2-(p-Bromophenylthio)ethyl]-N-nitrosoalanine. Repetition of the procedure detailed in Example 8B while utilizing 115 parts of N-[2-(p-bromophenylthio)-ethyl]alanine, 27 parts of sodium nitrite, 1000 parts of water and 1400 parts of dichloromethane affords N-[2-(p-bromophenylthio)ethyl]-N-nitrosoalanine, C. 3-[2-(p-Bromophenylthio)ethyl]-4-methylsydnone. Repetition of the procedure detailed in Example 7C while utilizing 105 parts of N-[2-(p-bromophenylthio)-ethyl]-N-nitrosoalanine and 1000 parts of acetic anhydride affords 3-[2-(p-bromophenylthio)ethyl]-4-methylsydnone, melting at about 84.5°–85.5°.

EXAMPLE 44

By substituting equivalent quantities of 2-(o-methylphenylthio)ethylamine, 2-(2,4,6-trimethylphenylthio)ethylamine, 2-(o-methoxyphenylthio)ethylamine, 2-(4-bromo-3-methylphenylthio)ethylamine, 2-(2,3,4,5,6-pentachlorophenylthio)ethylamine and 2-(p-fluorophenylthio)ethylamine in the procedure of Example 2A, and in each instance employing equivalent amounts of potassium t-butoxide and 2-bromopropionic acid for the sodium methoxide and 2-bromoacetic acid used therein, there is obtained, respectively, N-[2-(o-methylphenylthio)ethyl]alanine, N-[2-(2,4,6-trimethylphenylthio)ethyl]alanine, N-[2-(o-methoxyphenylthio)ethyl]alanine, N-]2-(4-bromo-3-methylphenylthio)ethyl]alanine, N-[2-(2,3,4,5,6-pentachlorophenylthio)ethyl]alanine and N-[2-(p-fluorophenylthio)ethyl]alanine.

EXAMPLE 45

Successively processing equivalent quantities of each of the above compounds according to the procedures outlined in Examples 8B and 7C affords the corresponding sydnones, 3-[2-(o-methylphenylthio)ethyl]-4-methylsydnone, melting at about 82°–83°, 3-[2-(2-(2,4,6-trimethylphenylthio)ethyl]-4-methylsydnone, melting at about 63°–64°, 3-[2-(o-methoxyphenylthio)ethyl]-4-methylsydnone, melting at about 57°–59°, 3-[2-(4-bromo-3-methylphenylthio)ethyl]-4-methylsydnone, melting at about 77°, 3-[2-(2,3,4,5,6-pentachlorophenylthio)ethyl]-4-methylsydnone, melting at about 110°, and 3-[2-(p-fluorophenylthio)ethyl]-4-methylsydnone, melting at about 92°–93°.

EXAMPLE 46

Substitution of equivalent quantities of 3-[2-(o-methylphenylthio)ethyl]-4-methylsydnone, 3-[2-(4-bromo-3-methylphenylthio)ethyl]-4-methylsydnone and 3-[2-(p-fluorophenylthio)ethyl]-4-methylsydnone in the procedure of Example 22, affords, respectively, 3-[2-(o-methylphenylsulfinyl)ethyl]-4-methylsydnone, melting at about 91°–92°, 3-[2-(4-bromo-3-methylphenylsulfinyl)ethyl]-4-methylsydnone, and 3-[2-(p-fluorophenylsulfinyl)ethyl]-4-methylsydnone, melting at about 86°.

What is claimed is:

1. A compound of the formula

wherein R represents hydrogen, lower alkyl, phenyl, or bromo; Alk represents alkylene containing more than 1 and fewer than 5 carbons; Z represents oxygen, thio, sulfinyl, or sulfonyl; x represents 0 or 1; and Ar represents naphthyl, phenyl, or phenyl substituted by members selected from less than 3 of the group consisting of lower alkyl, halogen, lower alkoxy, and nitro.

2. A compound according to claim 1 having the formula

wherein R represents hydrogen or lower alkyl; Alk represents alkylene containing more than 1 and fewer than 5 carbons; Z represents thio, sulfinyl or sulfonyl; x represents 0 or 1; and Ph represents (lower alkyl)phenyl, halophenyl having fewer than 3 halogens, (lower alkoxy)phenyl or nitrophenyl.

3. A compound according to claim 1 having the formula

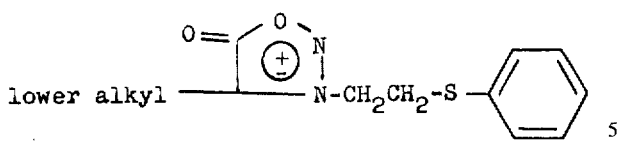

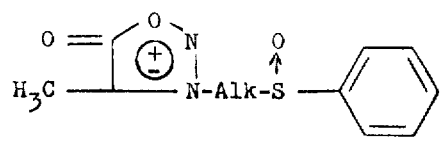

4. A compound according to claim 1 which is 4-methyl-3-[2-(phenylthio)ethyl]sydnone.

5. A compound according to claim 1 having the formula

wherein Alk represents alkylene containing more than 1 and fewer than 5 carbons.

6. A compound according to claim 1 which is 3-[2-(p-tert.-butylphenylthio)ethyl]-4-methylsydnone.

7. A compound according to claim 1 having the formula

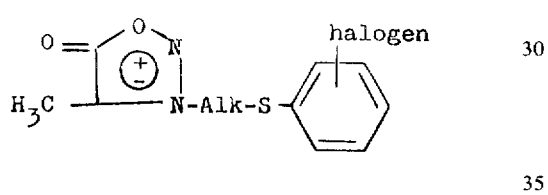

wherein Alk represents alkylene containing more than 1 and fewer than 4 carbons.

8. A compound according to claim 1 which is 3-[2-(p-chlorophenylthio)ethyl]-4-methylsydnone.

9. A compound according to claim 1 having the formula

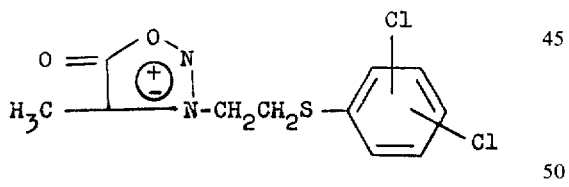

10. A compound according to claim 1 having the formula

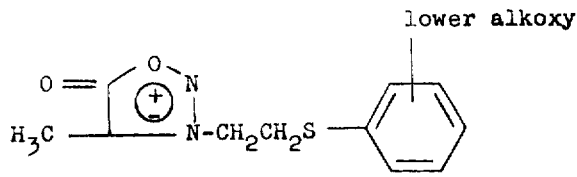

11. A compound according to claim 1 which is 3-[2-(p-methoxyphenylthio)ethyl]-4-methylsydnone.

12. A compound according to claim 1 having the formula wherein Alk represents alkylene containing more than 1 and fewer than 5 carbons.

13. A compound according to claim 1 which is 4-methyl-3-[3-(phenylsulfinyl)propyl]sydnone.

14. A compound according to claim 1 having the formula

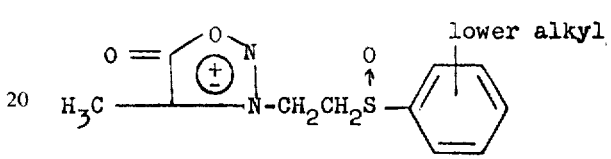

15. A compound according to claim 1 which is 3-[2-(p-tert.-butylphenylsulfinyl)ethyl]-4-methylsydnone.

16. A compound according to claim 1 having the formula

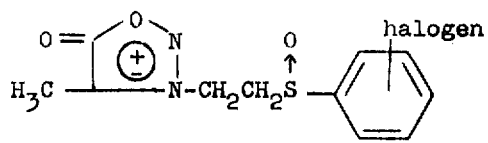

17. A compound according to claim 1 which is 3-[2-(p-chlorophenylsulfinyl)ethyl]-4-methylsydnone.

18. A compound according to claim 1 having the formula

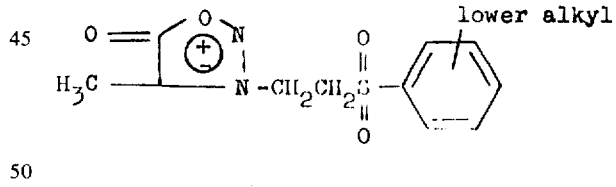

19. A compound according to claim 1 which is 3-[2-(p-tert.-butylphenylsulfonyl)ethyl]-4-methylsydnone.

20. A compound according to claim 1 having the formula

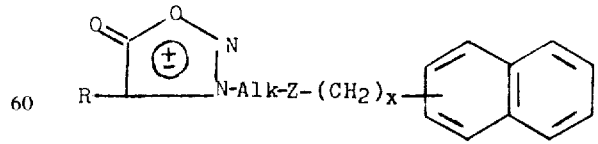

wherein R represents hydrogen or lower alkyl, Alk represents alkylene containing more than 1 and fewer than 5 carbons; Z represents thio, sulfinyl or sulfonyl; and $x$ represents 0 or 1.

21. A compound according to claim 1 having the formula
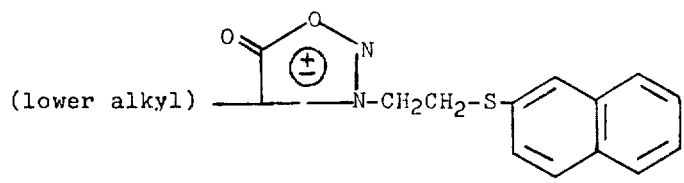
22. A compound according to claim 1 which is 4-methyl-3-]2-(2-naphthylthis)ethyl]sydnone.
* * * * *